(12) United States Patent
Nevadunsky et al.

(10) Patent No.: US 8,146,405 B2
(45) Date of Patent: Apr. 3, 2012

(54) APPARATUS AND METHODS FOR INDICATING SEAL LEAKAGE

(75) Inventors: Joseph John Nevadunsky, Bradley Beach, NJ (US); Carlos Edgar Enriquez, Corpus Christi, TX (US)

(73) Assignee: De Dietrich Process Systems, Inc., Mountainside, NJ (US)

( * ) Notice: Subject to any disclaimer, the term of this patent is extended or adjusted under 35 U.S.C. 154(b) by 1018 days.

(21) Appl. No.: 12/046,364

(22) Filed: Mar. 11, 2008

(65) Prior Publication Data

US 2009/0229695 A1   Sep. 17, 2009

(51) Int. Cl.
    *G01M 3/08* (2006.01)
(52) U.S. Cl. .......................................... 73/46
(58) Field of Classification Search .............. None
    See application file for complete search history.

(56) References Cited

U.S. PATENT DOCUMENTS

| | | | |
|---|---|---|---|
| 3,589,403 A | 6/1971 | Chase | |
| 3,615,984 A * | 10/1971 | Chase | 156/94 |
| 3,651,558 A | 3/1972 | Chase | |
| 4,321,110 A | 3/1982 | Nickel et al. | |
| 4,424,973 A | 1/1984 | Heilala | |
| 4,887,395 A | 12/1989 | Lebeck et al. | |
| 5,149,105 A | 9/1992 | Beaver et al. | |
| 5,201,531 A | 4/1993 | Lai | |
| 5,217,235 A | 6/1993 | Walker et al. | |
| 5,331,841 A * | 7/1994 | Beaver et al. | 73/49.2 |
| 5,562,406 A | 10/1996 | Ooka et al. | |
| 5,599,600 A | 2/1997 | Rau | |
| 5,756,882 A * | 5/1998 | Cranfill et al. | 73/46 |
| 5,918,628 A * | 7/1999 | Harding | 137/512.1 |
| 2003/0111795 A1 | 6/2003 | Glassman et al. | |

FOREIGN PATENT DOCUMENTS

| | | |
|---|---|---|
| JP | 63281035 A | 11/1988 |
| JP | 2007051775 A | 3/2007 |
| WO | WO 2006/004866 A2 | 1/2006 |

* cited by examiner

*Primary Examiner* — Hezron E Williams
*Assistant Examiner* — Mark A Shabman
(74) *Attorney, Agent, or Firm* — Chipperson Law Group

(57) ABSTRACT

Apparatus and methods for indicating seal leakage between two components are provided. In one aspect, apparatus and methods for directing material penetrating a leaking nozzle repair shield seal to a predetermined indication point such that a user viewing such indication point is alerted to the leaking seal condition is provided. In one aspect of the present invention, a channel having six distinct sections directs the material to the indication point. These six channel sections include two annular sections extending about the periphery of a main cylindrical section and an inwardly facing surface of a flange of the nozzle repair shield. These six channel sections further include a reservoir and interconnecting channel sections. Also, a sleeve for encircling the outwardly facing surface of the main cylindrical section of the nozzle repair shield is provided and the indication point may be provided in the form of a reservoir.

3 Claims, 6 Drawing Sheets

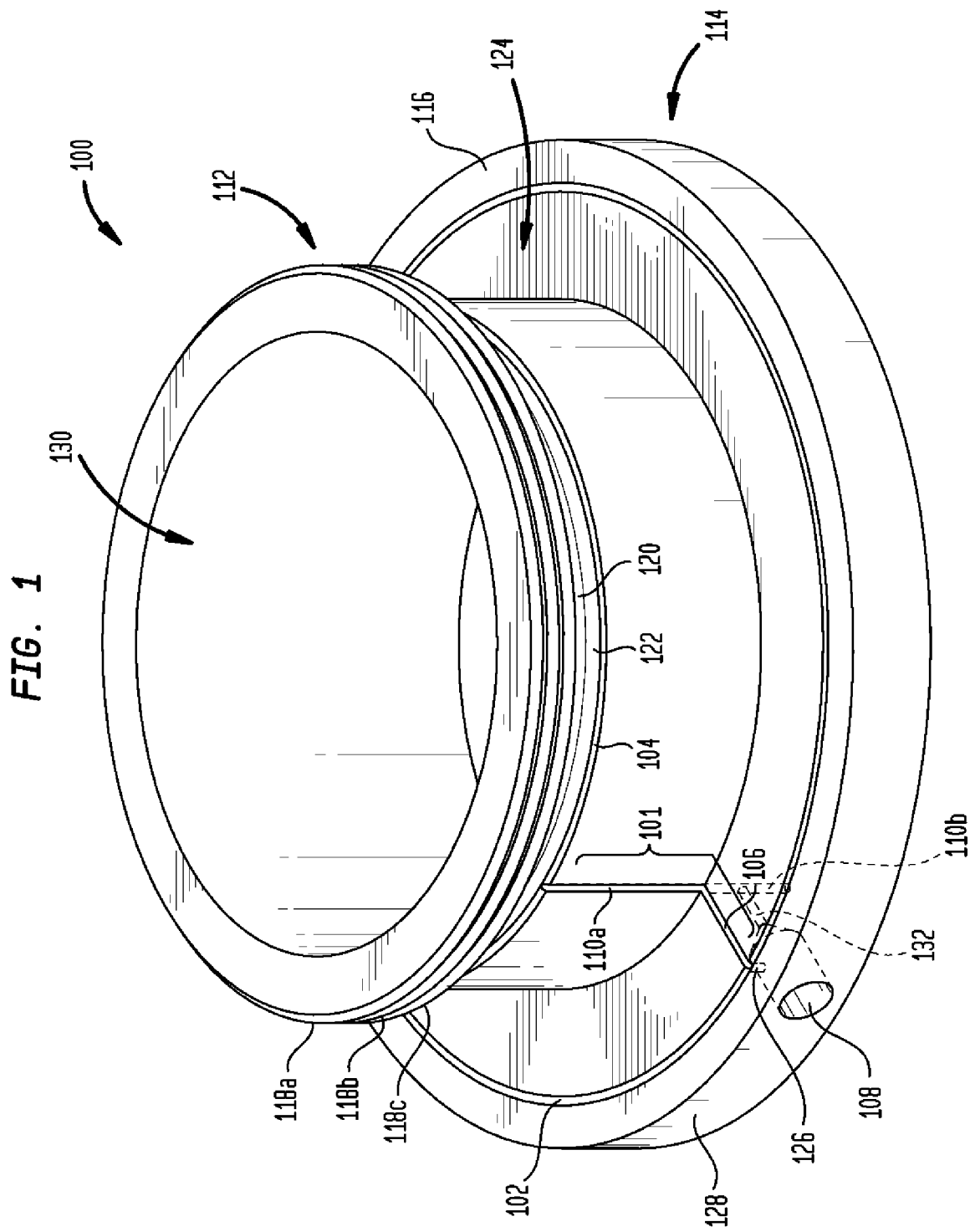

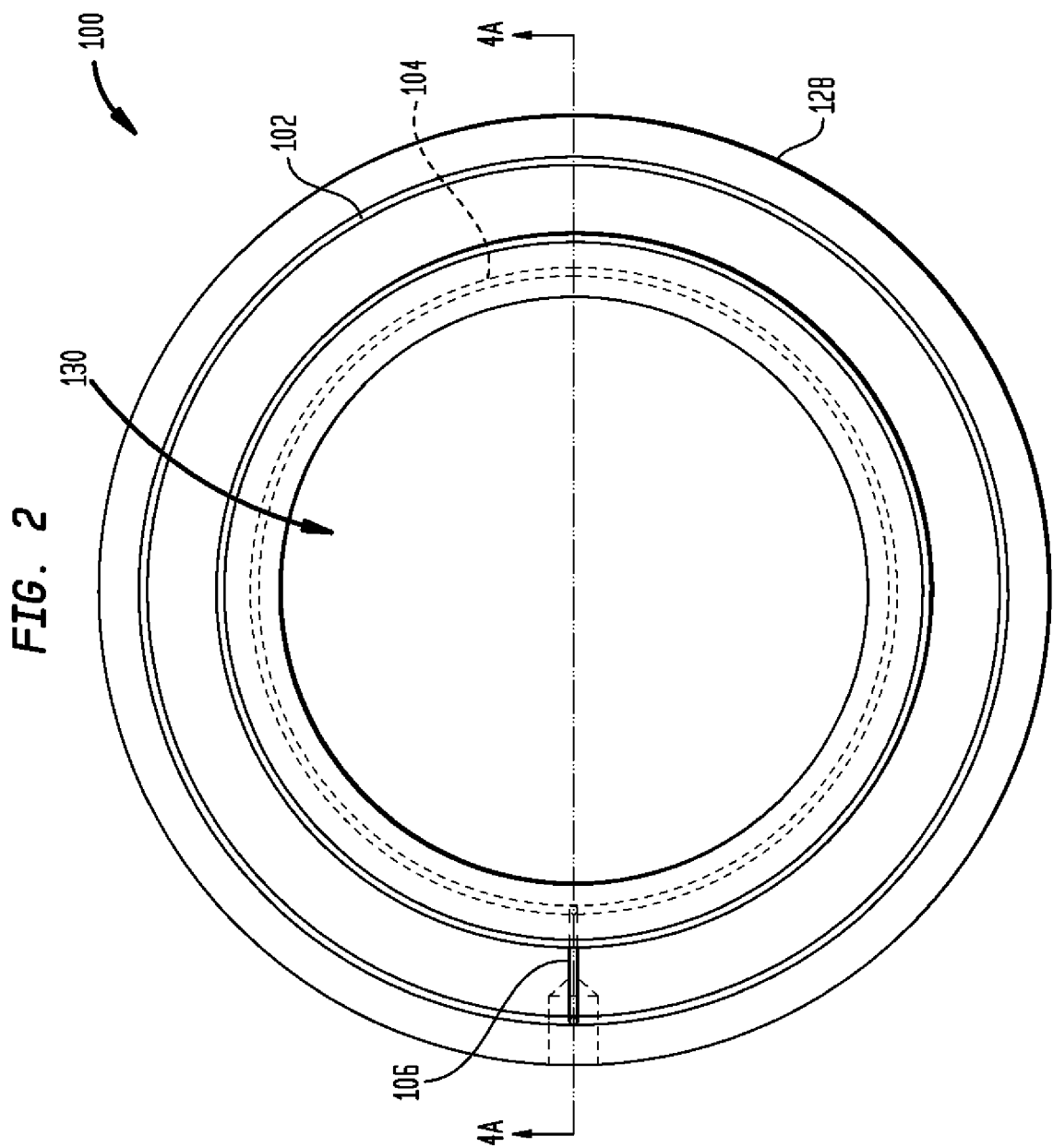

APPARATUS AND METHODS FOR INDICATING SEAL LEAKAGE

BACKGROUND OF THE INVENTION

Embodiments of the present invention generally relate to apparatus and methods for indicating seal leakage in a nozzle repair shield. More specifically, the present invention relates to apparatus and methods for directing material penetrating a leaking nozzle repair shield seal to a predetermined indication point such that a user viewing such indication point is alerted to the leaking seal condition.

In the chemical industry, use of glass or ceramic-lined reaction vessels for processing chemicals is often essential. For example, glass or ceramic-lined reaction vessels are used when the reactants and/or products of a reaction are highly corrosive as glass and ceramic are more tolerant of corrosive materials than carbon steel, stainless steel, metal alloys, or the like.

Additionally, glass or ceramic-lined reaction vessels are often used when the reactants and/or products of a chemical reaction are highly reactive as the surfaces of non-glass or non-ceramic (e.g., the surfaces of metal and alloy reaction vessels) can act as reaction sites for unwanted side reactions. Such side reactions may cause contamination of the end product as well as damage to the reaction vessel or its components. For example, an exothermic reaction may cause the maximum temperature of the reaction vessel or its components to be exceeded. This could result in damage to the components or breakage of the reaction vessel itself.

Although glass or ceramic reaction vessels can withstand corrosion and prevent side reactions, many of the reactions required for production of chemicals and other materials are performed under high temperature, high pressure, and/or vacuum conditions. Glass or ceramic reactions often cannot withstand such conditions. Therefore, it is common to line a carbon steel, stainless steel, or other metal alloy reaction vessel with glass or ceramic to allow the reaction vessel to be able to operate under corrosive and reactive conditions as well as under high temperature, high pressure, and/or vacuum conditions.

Maintaining the surfaces of a glass or ceramic-lined vessel is essential to ensure that the reaction vessel maintains its functionality as described above. The nozzles of glass and ceramic-lined reaction vessels tend to be more susceptible to damage than the other components of the reaction vessel. These nozzles are often used to attach valves, instrumentation, auxiliary equipment, feed piping, product piping, or the like. For example, the nozzles may be damaged when parts such as agitators, dip pipes, thermowells, or valves are broken during use. Alternatively, the nozzles may be damaged during the replacements of such parts.

Some apparatus and methods are known for repairing nozzles of glass and ceramic lined-vessels. Via one of the simplest methods, the damaged surface of the nozzle is first cleaned. If any rough edges exist, the nozzle surface is sanded such that a smooth surface results. Any recesses in the surface are then filled with a curable resin to ensure that there is no exposed metal. The nozzle and adjacent areas of the reaction vessel are then sheathed. Any gaps are filled with a curable resin.

Using one such repair method, the nozzle and adjacent area are sheathed with a two piece metal cover. The metal must be inert under the conditions of use of the reaction vessel being repaired. The cover is comprised of an outer and inner faceplate. The outer faceplate has a returning flange that covers the outwardly facing edge of the nozzle being repaired. The inner faceplate is crimped to the outer faceplate and covers the interior portion of the nozzle being repaired while mating with the outer faceplate. An inert gasket is also used to further secure the nozzle and cover.

Another known repair method includes sheathing the nozzle and adjacent area with a two piece, threaded metal cover. This method includes removing damaged portions of the nozzle with a cutting torch or the like. The remaining portion of the nozzle is then edge-tapered for welding. A replacement nozzle equivalent to the removed damaged portion is then welded onto the portion of the nozzle that remains. Next, the nozzle and adjacent portions of the reaction vessel are sheathed with a metal cover, wherein the metal is inert under the conditions of use of the reaction vessel being repaired. The metal cover includes inner and outer faceplates that are mated by threading the faceplates together.

Other similar repair methods include sheathing the nozzle and adjacent area with a machined polytetrafluoroethylene ("PTFE") repair shield. One such repair shield includes a cylindrical body portion having an annular flange disposed from the top end and at least one sealing lip disposed at its lower end. The body portion further includes an annular support band located in its lower end for supporting the sealing lip during insertion and use. The shield further includes resilient spacing members between the sealing lips to minimize damage to the sealing lips and subsequent loss of a fluid-tight seal.

When repairing a damaged nozzle of a glass or ceramic-lined metal alloy reaction vessel, it is necessary to ensure that the repair device is completely sealed to the nozzle. If it is not, corrosive materials may seep between the repair device and the nozzle causing further damage to the nozzle. This damage may lead to the escape of the corrosive materials from the reaction vessel, which may in turn cause injury to nearby workers or damage to other components of the reaction system. Additionally, reactant and/or product loss could occur due to spillage. Without a proper seal between the repair device and the nozzle, the reaction vessel is also not likely to hold the required temperature, pressure, or vacuum, which is likely to prevent the needed reaction from occurring. Such reaction failure is also likely to result in reactant and/or product loss.

BRIEF SUMMARY OF THE INVENTION

Briefly stated, in one aspect of the present invention, an apparatus for repairing a nozzle having an integral seal leakage indication mechanism is provided. This apparatus includes: a main cylindrical section having a first end and a second end, the main cylindrical section having a first section diameter of a first outwardly facing surface of the main cylindrical section; a sleeve, the sleeve having a first sleeve diameter of an inwardly facing sleeve surface having a magnitude greater than the first section diameter, the inwardly facing sleeve surface encircling the first outwardly facing surface; a flange disposed at the first end; and a channel, the channel including a first end located in the first outwardly facing surface beneath the inwardly facing sleeve surface, and the channel including a second end located in the flange.

In another aspect of the present invention, a method for indicating leakage of a material located on a first side of a seal between a first seal surface of a first component and a second seal surface of a second component to a second side of the seal is provided. This method includes the steps of: receiving the material leaking from the first side of the seal to the second side of the seal between the first seal surface and the second seal surface into at least one portion of a channel, the channel located on the second side of the seal; and channeling the material from the portion of the channel through the channel to an end of the channel; wherein the material present in the end of the channel is visible at the location of at least one indication point.

In yet another aspect of the present invention, an apparatus for indicating leakage of a seal between the apparatus and a component is provided. This apparatus includes: a body including at least one body surface, the at least one body surface contacting at least one component surface of the component in at least two points, the contact forming at least one enclosed cavity between the body and the component; at least one channel, a first end of the at least one channel located in a portion of the at least one body surface in fluid communication with the cavity, and a second end of the at least one channel located internal to the apparatus.

In another aspect of the present invention, a method for indicating leakage of a material located on a first side of a seal between a first seal surface of a first component and a second seal surface of a second component to a second side of the seal is provided. This method includes the steps of: receiving the material leaking from the first side of the seal to the second side of the seal between the first seal surface and the second seal surface into at least one cavity; receiving the material present in the at least one cavity into at least one portion of a channel, the channel located on the second side of the seal; and channeling the material from the portion of the channel through the channel to an end of the channel; wherein the material present in the end of the channel is visible at the location of at least one indication point.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings:

FIG. 1 is an apparatus for repairing a nozzle having an integral seal leakage indication mechanism in accordance with one embodiment of the present invention in which the sleeve of FIG. 3A is removed;

FIG. 2 is a top view of the apparatus depicted in FIG. 1;

DETAILED DESCRIPTION OF THE INVENTION

Figure 3A:
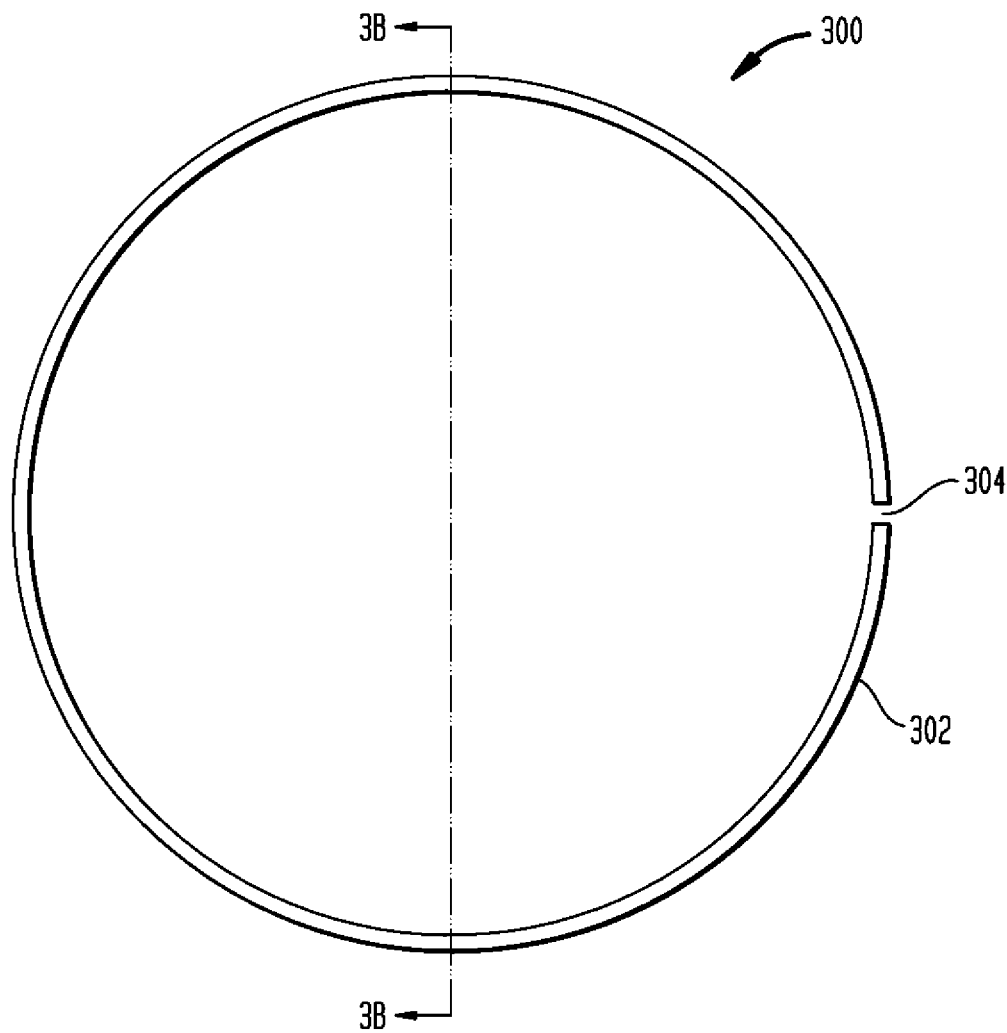
FIG. 3A is a top view of a sleeve for use in conjunction with the apparatus depicted in FIG. 1.

Certain terminology may be used in the following description for convenience only and is not limiting. The words "lower" and "upper" and "top" and "bottom" designate directions in the drawings to which reference is made. The terminology includes the words above specifically mentioned, derivatives thereof and words of similar import.

Where a term is provided in the singular, the inventors also contemplate aspects of the invention described by the plural of that term. As used in this specification and in the appended claims, the singular forms "a", "an" and "the" include plural references unless the context clearly dictates otherwise, e.g., "a seal" includes a plurality of seals. Thus, for example, a reference to "a method" includes one or more methods, and/or steps of the type described herein and/or which will become apparent to those persons skilled in the art upon reading this disclosure.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods, constructs and materials are now described. Any publications mentioned herein are incorporated herein by reference in their entirety. Where there are discrepancies in terms and definitions used in references that are incorporated by reference, the terms used in this application shall have the definitions given herein.

Figure 3B:
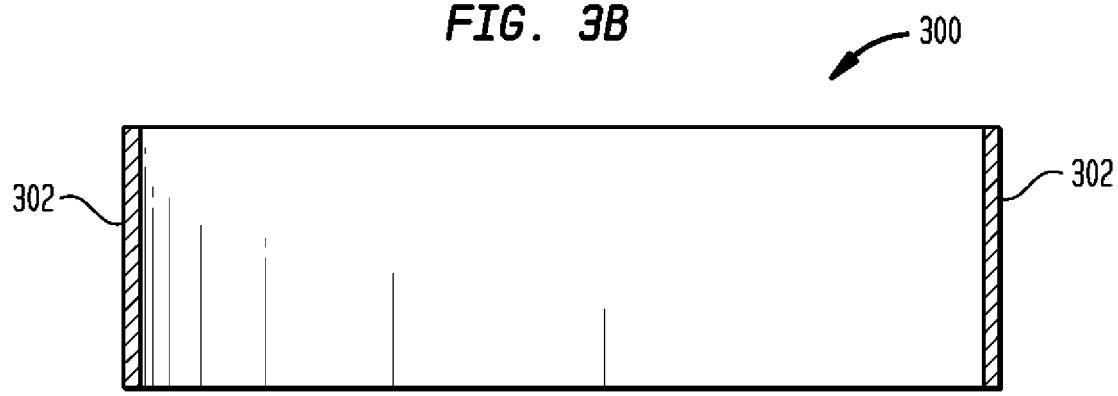
FIG. 3B is a cross-sectional view of the apparatus depicted in FIG. 3A taken along lines 3B-3B of FIG. 3A.

Referring first to FIG. 1, depicted is a perspective view of nozzle repair apparatus 100 in accordance with one embodiment of the present invention. Nozzle repair apparatus 100 includes, inter alia, main cylindrical section 124, outer cylindrical section 112, and flange 114 and is installed in conjunction with sleeve 300 (FIGS. 3A and 3B). Nozzle repair apparatus 100 is designed for repair of the nozzle of a reaction vessel such as a glass or ceramic-lined reaction vessel or similar types of equipment.

Generally, in one embodiment of the present invention, nozzle repair apparatus 100 indicates leakage of a seal between nozzle repair apparatus 100 and a component to which it is coupled such as the nozzle of a reaction vessel. As depicted in FIG. 4B, the distal ends of annular protrusions 118 and inwardly facing surface 116 of flange 114 contact the inwardly facing surface of such nozzle at two distinct points such that cavity 402 is formed between nozzle repair apparatus 100 and the nozzle. Channel 101, located on and internal to nozzle repair apparatus 100, has a first end located in a portion of the surface of repair nozzle apparatus 100 that is in fluid communication with cavity 402 and a second end located internal to nozzle repair apparatus 100 and passing through an external surface thereof (e.g., at reservoir 108). This configuration of channel 101 allows material leaking through the seal (i.e., the seal between the nozzle and the distal ends of annular protrusions 118) into cavity 402 to be channeled from a first end of channel 101 to an indication point located at the second end of channel 101. Since the second end of channel 101 is located at the external surface of nozzle repair apparatus 100, this end is easily viewable by a user, which allows the user to easily look for the presence of such leaking material at the indication point without the need to remove nozzle repair apparatus 100 from the nozzle or otherwise disrupt nozzle repair apparatus 100.

More specifically, main cylindrical section 124 is a cylindrical section of a material such as PTFE or the like having a cylindrical passageway 130 therethrough. As better depicted in FIGS. 4A and 4B, the upper end of main cylindrical section 124 is coupled to outer cylindrical section 112.

Outer cylindrical section 112 is also a cylindrical section made of a material such as PTFE or the like having cylindrical passageway 130 therethrough. In the depicted embodiment of the present invention, outer cylindrical section 112 includes annular tapered section 122 and a plurality of annular protrusions 118. The outwardly facing surface of annular tapered section 122 is tapered from a first outer diameter, which is equivalent to the outer diameter of main cylindrical section 124, to a second smaller outer diameter, which second smaller outer diameter is equivalent to the outer diameter of the sections of outer cylindrical section 112 located between annular protrusions 118. Annular tapered section 122 provides a machining transition/relief between main cylindrical section 124 and annular protrusions 118.

In the depicted embodiment, annular protrusions 118 are in the form of rings that extend from the base of outer cylindrical section 112 beyond the outer diameter of main cylindrical section 124. Although the depicted embodiment depicts three annular protrusions 118, another quantity may be substituted without departing from the scope of the present invention.

Figure 4A:
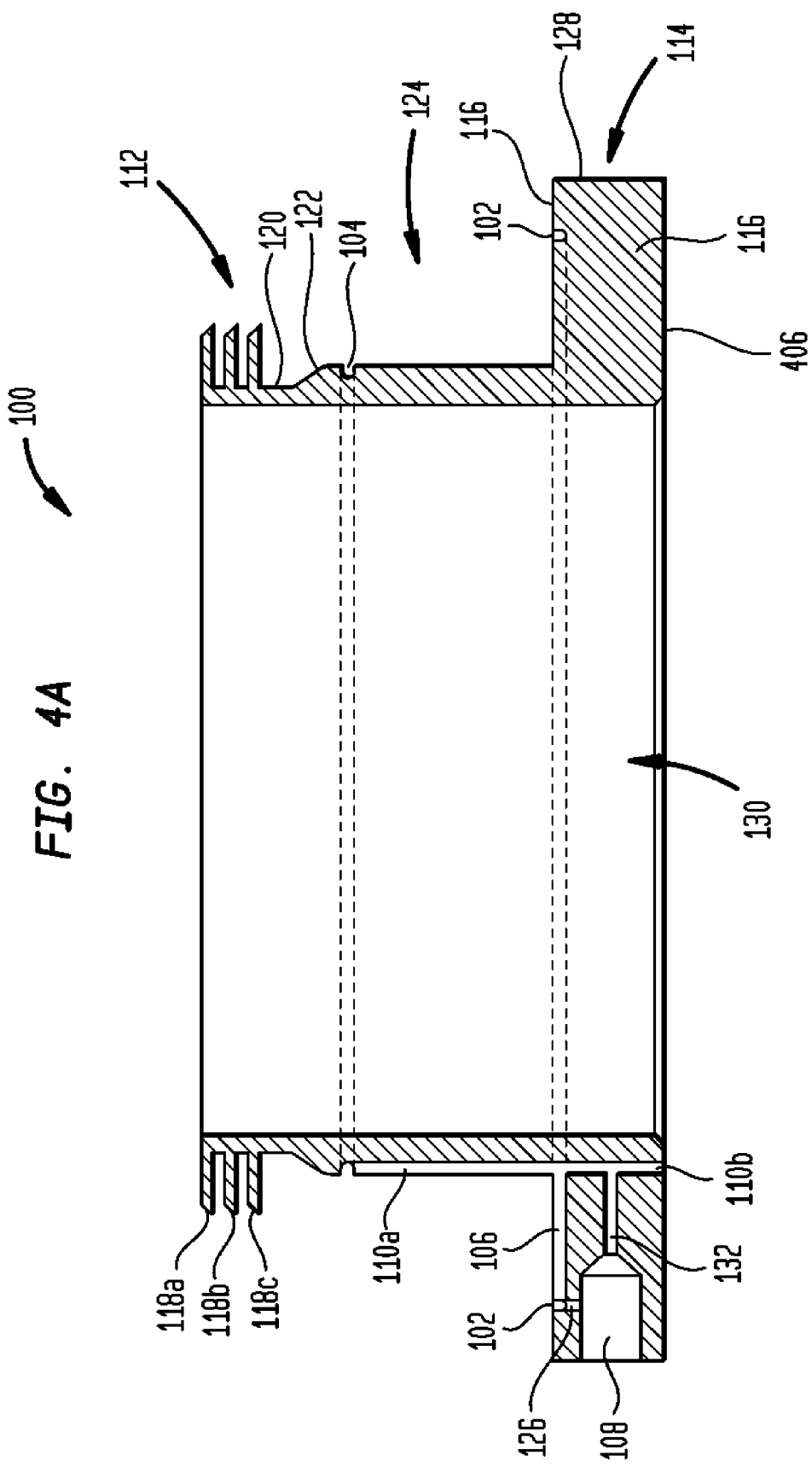
FIG. 4A is a cross-sectional view of the apparatus depicted in FIGS. 1 and 2 taken along lines 4A-4A of FIG. 2.
Figure 4B:
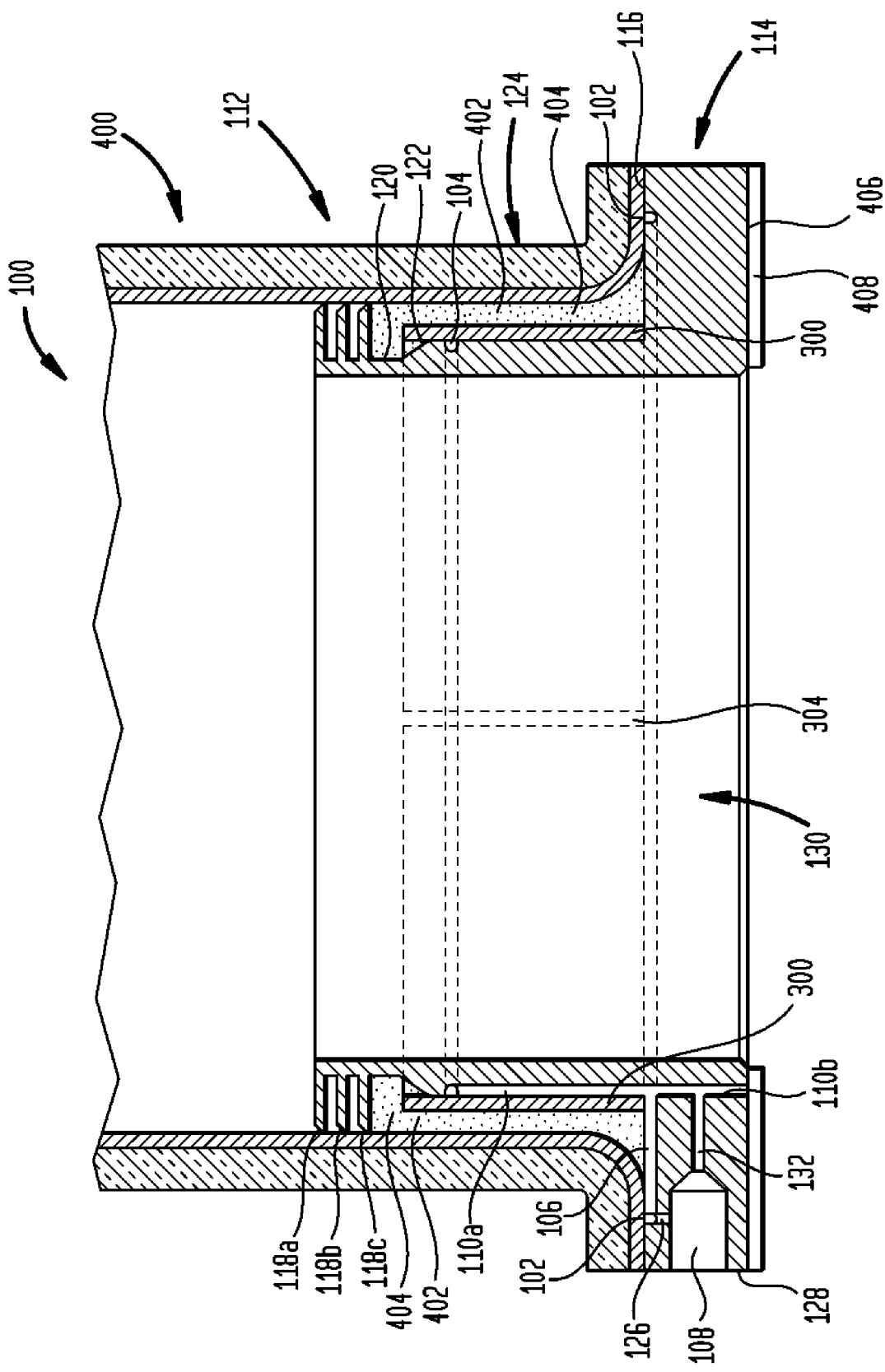
FIG. 4B is a cross-sectional view of the installation of the apparatus depicted in FIG. 1, with the sleeve depicted in FIGS. 3A and 3B coupled thereto, in a nozzle.

As better depicted in FIGS. 4A and 4B, the lower end of main cylindrical section 124 is coupled to flange 114. Flange 114 is also a cylindrical section of a material such as PTFE having a cylindrical passageway 130 therethrough. The outer diameter of flange 114 is greater than the outer diameter of all other components of nozzle repair apparatus 100 (e.g., annular protrusions 118, main cylindrical section 124, etc.) and the thickness of its walls are also greater than the thickness of the walls of main cylindrical section 124 and outer cylindrical section 112. The thickness of the walls of flange 114 is such that flange 114 mates with the flanged area of the nozzle of the reaction vessel as depicted in FIG. 4B.

In the depicted embodiment, nozzle repair apparatus 100 is molded as a single unit manufactured from a material such as PTFE. However, multi-piece nozzle repair apparatus and/or nozzle repair apparatus manufactured from a material other than PTFE or via a method other than molding may be substituted without departing from the scope of the present invention.

To better understand the advantages of nozzle repair apparatus 100, the use of nozzle repair apparatus 100 to repair a nozzle will first be described with reference to FIG. 4B. FIG. 4B depicts a cross-sectional view of the installation of nozzle repair apparatus 100 having sleeve 300 coupled thereto in nozzle 400. Such repair is performed by first cleaning nozzle 400 to ensure that it is free of any contaminants and/or product build-up. For example, nozzle 400 may be cleaned with isopropyl alcohol.

Next, the metal portion of the vessel located below the damaged glass or ceramic lining is inspected for damage. If the damage to the nozzle is extensive, an evaluation is performed to determine whether the integrity of the vessel has been compromised and whether the original American Society of Mechanical Engineers ("ASME") code rating can be maintained after repair. If the vessel is repairable, it is repaired according to commercially known methods.

Using one such method, first, any rust on any exposed metal surfaces is removed by grinding such surface until a sound metal surface is achieved. Grinding may be performed via a hand grinder having an idle speed of approximately 30,000 RPM such as, but not limited to, a Dremel Mototool fitted with a mounted wheel such as a Baystate grinding wheel having part no. 1C90Q8V32-5B121. Additionally, any fractured and/or chipped glass shall also be removed via grinding.

Then, any exposed metal areas that are greater than one-eighth inch below the surface of the glass lining and are greater than two inches square are repaired, for example, via weld repairing as is commercially known. Weld repairing may be required along with the appropriate documentation to reinstate vessel integrity and to maintain the original ASME pressure rating.

Next, damaged areas are filled with a filler such as, but not limited to, Devcon Titanium Putty as manufactured by DeDietrich Process Solutions, Inc. and having model no. DDP #1250. The filler is applied to the necessary areas and is built up slightly above the surface of the glass lining. The filler is then allowed to cure. Thereafter, the filled areas are ground until they are smooth and flush with the surrounding surfaces of the glass lining. Finally, all grinding dust is removed from the nozzle and it is cleaned again with isopropyl alcohol. Although the aforementioned process of preparing a nozzle for insertion of a nozzle repair apparatus (e.g., nozzle repair apparatus 100) is explained in detail, other such processes may be substituted without departing from the scope of the present invention.

After nozzle 400 has been fully prepared for insertion of nozzle repair apparatus 100, nozzle repair apparatus 100 is prepped for same. First, sleeve 300 is separated at sleeve break 304 to the extent necessary to pass sleeve 300 around the outwardly facing surface of main cylindrical section 124. Sleeve 300 is then rotated relative to main cylindrical section 124 to offset sleeve break 304 from the location of second channel section 110a to prevent filling second channel section 110a with filler 404 (e.g., expanded PTFE) as discussed in greater detail below. Sleeve 300 prevents the infiltration of filler 404, as discussed in greater detail below, into first annular channel section 104 and second channel section 110a.

Once nozzle repair apparatus 100 is fully prepped, it is inserted into nozzle 400 with a distal end of outer cylindrical section 112 entering nozzle 400 first. In one aspect of the present invention such as that depicted in FIGS. 1 through 4B, outer cylindrical section 112 includes a plurality of annular protrusions 118 projecting from outwardly facing surface 120 of outer cylindrical section 112. The distal ends of protrusions 118 exert pressure on the inwardly facing surfaces of nozzle 400, thereby forming a seal therewith through which material within nozzle 400's reaction vessel should not pass. This seal prevents contact of such material with the damaged nozzle surface located external to the outwardly facing surface of sleeve 300.

Referring back to FIG. 1, the apparatus and method for indicating seal leakage in a seal formed between nozzle repair apparatus 100 and the inwardly facing surface of the repaired nozzle will now be described. As depicted in FIG. 1, nozzle repair apparatus 100 includes channel 101 having a first end (i.e., first annular channel section 104) located in main cylindrical section 124 and second ends (i.e., reservoir 108 and extended second channel section 110b) located in flange 114.

In the embodiment of the present invention depicted in FIGS. 1 through 4B, channel 101 includes seven sections. The first such section, namely, first annular channel section 104 is located in the outwardly facing surface of main cylindrical section 124. First annular channel section 104 surrounds the entire periphery of main cylindrical section 124 and it is substantially horizontal. This section is in fluid communication with, and is perpendicular to, second channel section 110a and extended second channel section 110b.

Second channel section 110a is also located in the outwardly facing surface of main cylindrical section 124, however, it is parallel to the axis of repair nozzle apparatus 100. A first end thereof is located at first annular channel section 104 and a second end is located at the intersection of main cylindrical section 124 and flange 114. Alternate embodiments of the present invention are envisioned in which second channel section 110 is not parallel to the axis of repair nozzle apparatus 100, or is non-linear, but such section is in fluid communication with one or more other sections of channel 101.

Channel 101 also includes third annular channel section 102, which is located in inwardly facing surface 116 of flange 114 within the outer half thereof. Third annular channel section 102 surrounds the entire periphery of inwardly facing surface 116 of flange 114 and it is substantially horizontal. Third annular channel section 102 is in fluid communication with fourth channel section 106, which is also located in inwardly facing surface 116 of flange 114. In the depicted embodiment of the present invention, fourth channel section 106 is a transverse channel section extending from the intersection of main cylindrical section 124 and flange 114 to third annular channel section 102. However, alternate embodiments of the present invention are envisioned in which fourth channel section 106 is not transverse to the axis of repair nozzle apparatus 100, or is non-linear, but such section is in fluid communication with one or more other sections of channel 101.

Reservoir 108 is also a portion of channel 101. Reservoir 108 is recessed in exterior surface 128 of flange 114. In the embodiment of reservoir 108 depicted in FIGS. 1 through 4B, reservoir 108 is substantially cylindrical and has a contoured bottom. However, other configurations or forms of reservoir 108 may be substituted without departing from the scope of the present invention. Additionally, non-reservoir recesses such as, but not limited to, bores may be substituted for reservoir 108 so long as such entities allow fluid to flow from channel 101 into same and/or to an exterior surface thereof (e.g., external surface 128). This allows a user of the reaction vessel to check same for indication of a seal leak as discussed in greater detail below.

Channel 101 also includes fifth channel section 126, which is primarily located internal to flange 114. Fifth channel section 126 is in fluid communication with third annular channel section 102, fourth channel section 106, and reservoir 108. Fifth channel section 126 runs parallel to the axis of nozzle repair apparatus 100 and it extends from the intersection of third annular channel section 102 and fourth channel section 106 to reservoir 108. Alternate embodiments of the present invention are envisioned in which fifth channel section 126 is not parallel to the axis of repair nozzle apparatus 100, or is non-linear, but such section is in fluid communication with one or more other sections of channel 101.

In the embodiment of the present invention depicted in FIGS. 1-4B, extended second channel section 110b is also a part of channel 101. This section is an extension of second channel section 110a, the latter of which is located in the outwardly facing surface of main cylindrical section 124. Similar to second channel section 110a, extended second channel section 110b is parallel to the axis of repair nozzle apparatus 100, however, extended second channel section 110b passes through the interior of flange 114 as depicted in FIGS. 1, 4A, and 4B. A first end thereof is located at the second end of second channel section 110a (i.e., at the intersection of main cylindrical section 124 and flange 114) and a second end thereof passes through outwardly facing surface 406 (FIGS. 4A and 4B) of flange 114. This configuration of extended second channel section 110b is selected due to the ease of creation of same. In the depicted embodiment, extended second channel section 110b may be created by simply drilling a hole through outwardly facing surface 406 (FIGS. 4A and 4B) of flange 114 until the bottommost end of second channel section 110a is reached. However, alternate embodiments of the present invention are envisioned in which extended second channel section 110b is not parallel to the axis of repair nozzle apparatus 100, or is non-linear, but such section is in fluid communication with one or more other sections of channel 101 such as, but not limited to, second channel section 110a and sixth channel section 132.

With reference to the above-described configuration of extended second channel section 110b, seeping material is not likely to exit the through the end of extended second channel section 110b located in outwardly facing surface 406 as such surface is typically covered with a tightly fit gasket 408. Although, if material were to seep through this aperture, it would likely travel between outwardly facing surface 406 and the adjacent gasket 408 until it exited at the point at which outwardly facing surface 406, the adjacent gasket 408, and external surface 128 intersect. Any material seeping from this location would be visible by a viewer viewing reservoir 108 and its surrounding surfaces due to the close proximity of this location to same. Consequently, the purposes of the present invention in this application are served regardless of whether seeping material seeps between outwardly facing surface 406 and the adjacent gasket 408.

The final portion of channel 101 is sixth channel section 132, which is located internal to flange 114. Sixth channel section 132 is in fluid communication with extended second channel section 110b and reservoir 108. In the depicted embodiment of the present invention, sixth channel section 132 is a transverse channel section bored through flange 114 and extending from the innermost end of reservoir 108 to an approximate midpoint of extended second channel section 110b. This configuration of sixth channel section 132 is selected due to the ease of creation of same. In the depicted embodiment, sixth channel section 132 may be created by simply drilling a hole through the innermost end of reservoir 108 until the hole reaches extended second channel section 110b. However, alternate embodiments of the present invention are envisioned in which sixth channel section 132 does not extend from the innermost end of reservoir 108, is not transverse to the axis of repair nozzle apparatus 100, or is non-linear, but such section is in fluid communication with one or more other sections of channel 101 including, but not limited to reservoir 108 and extended second channel section 110b.

In some embodiments of the present invention such as that depicted in FIGS. 1-4B, the sections of channel 101 other than reservoir 108, extended second channel section 110b, and sixth channel section 132 are substantially U-shaped. That is, the inwardly facing sides of such sections and the upwardly facing surface of the bottom thereof are shaped in the form of a U as best seen in the cross-sectional view of first annular channel section 104 of FIG. 4A. However, other forms for these sections of channel 101 may be substituted without departing from the scope of the present invention. For example, portions of channel 101 may be V-shaped or such portions may have parallel sides with a U- or V-shaped bottom. Additionally, different sections of channel 101 may have different forms than other sections of same.

In the embodiment of the present invention depicted in FIGS. 1-4B, extended second channel section 110b and sixth channel section 132 are substantially cylindrical bores. However, other forms for extended second channel section 110b and sixth channel section 132 may be substituted without departing from the scope of the present invention. For example, these portions of channel 101 may be triangular, square, or semicylindrical bores. Additionally, different sections of channel 101 may have different forms than other sections of same.

Although channel 101 is described above with specificity, such description is intended to provide an example of one embodiment of the present invention only. Virtually any other configuration of channel 101 may be substituted so long as the channel is capable of channeling material which has leaked through the seal between nozzle repair apparatus 100 and the inwardly facing surface of the repaired nozzle to an external surface of nozzle repair apparatus 100 or some other visible location. Also, although only one channel 101 is described, a plurality of independent channels may be substituted without departing from the scope of the present invention. For example, independent channels dedicated to specific leakage points, multiple channels to accommodate multiple indication points, etc. may be substituted.

The ability of channel 101 to channel leaking material to an indication point visible by a user will now be described with reference to FIG. 4B. As best seen in FIG. 4B, once nozzle 400 has been repaired via nozzle repair apparatus 100, any material flowing from or to the reaction vessel through nozzle 400 now passes through interior passageway 130 of nozzle repair apparatus 100 so long as the seal between the inwardly facing surface of nozzle 400 and nozzle repair apparatus 100 is intact. However, if such seal is damaged or otherwise begins to degrade, the material passing through interior passageway 130 may begin to seep or otherwise enter cavity 402. In repair apparatuses known in the art (i.e., those without seal damage indication), such seepage would typically continue undetected until a considerable amount of damage to nozzle 400, and potentially the surrounding components thereof, had occurred. However, nozzle repair apparatus 100 allows such seepage to enter the channel 101 at any one of a variety of entry points such as first annular channel section 104, second channel section 110, third annular channel section 102, or fourth channel section 106. Thereafter, the seepage is channeled through channel 101 to an indication point visible by a user for early detection of such seal leakage. Such early detection allows additional repairs to be made in order to eliminate or minimize the damage caused by the leaking seal. In some embodiments of the present invention, the contents of the reaction vessel are pressurized. Such pressurization may aid in forcing the seeping material to one or more indication points. However, the systems and methods of the present invention do not require a pressurized reaction vessel for proper operation. Channeling of seeping material through channel 101 is also aided by the continual seepage of the seeping material into channel 101, which acts to push the seeping material already present in channel 101 therethrough. Alternatively, seepage may be aided by other forces such as gravitational forces.

In the embodiment of the present invention depicted in FIGS. 1-4B, the indication point is reservoir 108, which is open to the external environment at its external end (i.e., the end of reservoir 108 that passing through external surface 128). In the absence of seal damage, reservoir 108 will remain vacant and no material will be viewable therein or upon exterior surface 128 of flange 114. Upon the occurrence of seal damage, seeping material will make its way through channel 101 to reservoir 108, whereupon it may or may not exit reservoir 108 (e.g., seeping material may flow upon the portions of exterior surface 128 that surround the external end of reservoir 108). Such seeping material will be viewable in reservoir 108 and/or upon external surface 128, thereby indicating to the user that a leak has occurred.

To further expand upon the channeling of seeping material through channel 101, examples of the movement of seeping material through channel 101 will now be described. In some embodiments of the present invention, seeping material that leaks into cavity 402 (e.g., by passing between annular protrusions 118 and the inwardly facing surface of nozzle 400) may continue to seep in a plurality of directions including, but not limited to: (1) between the inwardly facing surface of nozzle 400 and filler 404 and/or (2) between the outwardly facing surface of nozzle repair apparatus 100 and filler 404. When the seeping material follows direction (1), it is likely to continue to seep between the inwardly facing surface of nozzle 400 and filler 404 until it reaches third annular channel section 102 and/or fourth channel section 106. As the seeping material fills third annular channel section 102 and/or fourth channel section 106, the seeping material will be forced into the channel sections in fluid communication therewith. That is, the seeping material will eventually be forced into fifth channel section 126. As fifth channel section 126 fills with seeping material, such material will eventually flow into reservoir 108 and/or onto the areas of external surface 128 surrounding reservoir 108, whereupon it will be visible to a viewer and such visibility will indicate the presence of a leak to the viewer.

In another example, when the seeping material follows direction (2), it is likely to continue to seep between the outwardly facing surface of nozzle repair apparatus 100 and filler 404 until it reaches sleeve 300. At this point, the seeping material is likely to seep along the inwardly facing surface of sleeve 300 until it enters first annular channel section 104 or second channel section 110a. As the seeping material fills first annular channel section 104 and/or second channel section 110a, the seeping material will be forced into the channel sections in fluid communication therewith. For example, if the seeping material first enters first annular channel section 104, as this channel section fills (or due to pressurization of the reaction vessel, gravitational forces, etc.), the seeping material will eventually be forced to enter second channel section 110a. As second channel section 110a fills with seeping material, such material will eventually flow into either fourth channel section 106 or extended second channel section 110b. Any material entering fourth channel section 106 will eventually enter reservoir 108 by passing through fifth channel section 126 as discussed in greater detail above. Although Extended second section channel 110b provides a second path through which seeping material may be forced as second channel 110a is filled. This may be required if a portion of filler 404 fills any portion of fourth channel section 106 during the installation process, thereby resulting in a blockage in such channel section. In such a scenario, seeping material may still reach reservoir 108 via extended second channel section 110b and sixth channel section 132. That is, as extended second channel section 110b fills, the seeping material in extended second channel section 110b passes into sixth channel section 132, and, as sixth channel section 132 fills, the seeping material in sixth channel section 132 will pass into reservoir 108, whereupon it will be visible to a viewer and such visibility will indicate the presence of a leak to the viewer. However, although the embodiment of the present invention depicted in FIGS. 1-4B includes two pathways from second channel section 110a to reservoir 108 (i.e., fourth channel section 106/fifth channel section 126 and extended second channel section 110b/sixth channel section 132), embodiments of the present invention are envisioned in which only one pathway is included (i.e., fourth channel section 106/fifth channel section 126 or extended second channel section 110b/sixth channel section 132). Additionally, in embodiments of the present invention including two pathways, some channel sections such as fourth channel section 106 may be shortened and disconnected from one or more other sections of channel 101. For example, fourth channel section 106 may be coupled to fifth channel section 126 only (and not coupled to second channel section 110a or extended second channel section 110b) to allow fourth channel section 106 to only channel material that seeps directly into such channel section.

In yet another example, seeping material following direction (2) may also seep between the outwardly facing surface of sleeve 300 and the adjacent filler 404. In such a scenario, this material may continue such seepage until it reaches inwardly facing surface 116 of flange 114 at which point it may enter fourth channel section 106 or it may continue to seep between inwardly facing surface 116 and filler 404 until it enters fourth channel section 106 and/or third annular channel section 102. As the seeping material fills fourth channel section 106 and/or third annular channel section 102, the seeping material will be forced into the channel sections in fluid communication therewith and will be channeled to reservoir 108 via fifth channel section 126 and/or extended second channel section 110b and sixth channel section 132 as discussed in greater detail above. The material entering reservoir 108 will be visible to a viewer and such visibility will indicate the presence of a leak to the viewer.

Although a few routes for channeling seeping material to an indication point have been discussed herein with specificity, the apparatus and methods of the present invention may provide alternate routes of channeling seeping material to an indication point without departing from the scope hereof. For example, material may seep into cavity 402 via a route other than through annular protrusions 118 and the inwardly facing surface of nozzle 400. Or, as another example, seeping material may be routed to a section of channel 101 through a gap in filler 404. Regardless of the route of the leaking material, the apparatus and methods of the present invention will channel such leaking material to the indication point via the apparatus and methods described herein.

Although the movement of material through channel 101 is primarily discussed herein as movement due to a quantity of seeping material in excess of the available volume of the channel section, other forces may move the seeping material through any portion of channel 101 without departing from the scope of the present invention including, but not limited to, the force caused by pressurization of the reaction vessel and gravitational forces.

Turning next to FIG. 2, depicted is a top view of nozzle repair apparatus 100 including a top view of the annular nature of first annular channel section 104. The annular configuration of this channel section facilitates entry of seeping material into channel 101 as such channel section is present around the entire periphery of the outwardly facing surface of main cylindrical section 124. That is, as soon as any material seeping along main cylindrical section 124 reaches the location of first annular channel section 104, it is forced into channel 101 as there is no path by which the material can continue to seep without crossing first annular channel section 104. However, alternate embodiments of the present invention are envisioned in which first annular channel section may have a non-annular or semi-annular configuration.

Similarly, a top view of the annular nature of third annular channel section 102 is also depicted in FIG. 2. The annular configuration of this channel sections facilitates entry of seeping material into channel 101 as such channel section is present around the entire periphery of inwardly facing surface 116 of flange 114. That is, as soon as any material seeping through the interface of inwardly facing surface 116 and nozzle 400 reaches the location of third annular channel section 102, it is forced into channel 101 as there is no path by which the material can continue to seep without crossing third annular channel section 102. However, alternate embodiments of the present invention are envisioned in which third annular channel section may have a non-annular or semi-annular configuration.

Referring now to FIGS. 3A and 3B, depicted are a top view and a cross-sectional view taken along lines 3B-3B of FIG. 3A, respectively, of sleeve 300. As depicted, sleeve 300 is an annular sleeve having a slightly larger diameter than the outwardly facing surface of main cylindrical section 124. This allows the inwardly facing surface of the installed sleeve 300 to contact the outwardly facing surface (e.g. annular tapered surface 122) of nozzle repair apparatus 100 as depicted in FIG. 4B. Such contact prevents or minimizes the passage of filler 404 into first annular channel section 104 and second channel section 110a while allowing seeping material to penetrate therethrough.

Sleeve 300 includes sleeve break 304. Sleeve break 304 accommodates spreading the ends of sleeve 300 located adjacent to sleeve break 304 to the extent necessary to pass sleeve 300 around main cylindrical section 124. However, alternate embodiments of sleeve 300 and/or alternate methods of coupling sleeve 300 to main cylindrical section 124 may be substituted without departing from the scope of the present invention.

FIG. 3B depicts the relatively minimal thickness of walls 302 of sleeve 300. In the depicted embodiment, walls 302 have a thickness of approximately one-sixteenth of an inch. However, varying thicknesses of walls 302 may be substituted without departing from the scope of the present invention. Additionally, the height of walls 302 are such that the downwardly facing surface of walls 302 of installed sleeve 300, as depicted in FIG. 4B, is in contact with inwardly facing surface 116 of flange 114 and the upwardly facing surface of walls 302 of installed sleeve 300 rises to the approximate midpoint of annular tapered section 122. The contact between the inwardly facing surface of sleeve 300 and inwardly facing surface 116 of flange 114 prevents or minimizes passage of filler 404 into first annular channel section 104 and second channel section 110a. However, varying heights of walls 302 may be substituted while maintaining such contact without departing from the scope of the present invention.

Referring next to FIG. 4A, depicted is a cross-sectional view of nozzle repair apparatus 100 taken along lines 4A-4A of FIG. 2. As depicted, second and fourth channel sections 110 and 106 are situated substantially perpendicular to each other and they provide a connecting channel between first and third annular channel sections 104 and 102, respectively. Such channels sections are recessed into the outwardly facing surface of main cylindrical section 124 and inwardly facing surface 116 of flange 114, respectively. However, alternate embodiments of the present invention are envisioned in which such channel sections are not substantially perpendicular to each other. Also, alternate embodiments are envisioned in which one or more of such channel sections are bored through main cylindrical section 124 and flange 114, respectively, rather than being recessed in the surfaces thereof.

Also depicted in FIG. 4A is fifth channel section 126. This channel section is primarily located internal to flange 124 and it connects third annular channel section 102 and fourth channel section 106 to reservoir 108 such that they are in fluid communication therewith. Although fifth channel section 126 is depicted as a substantially vertical channel, or bore, alternate embodiments of fifth channel section 126 may be substituted without departing from the scope of the present invention.

Figure 5:
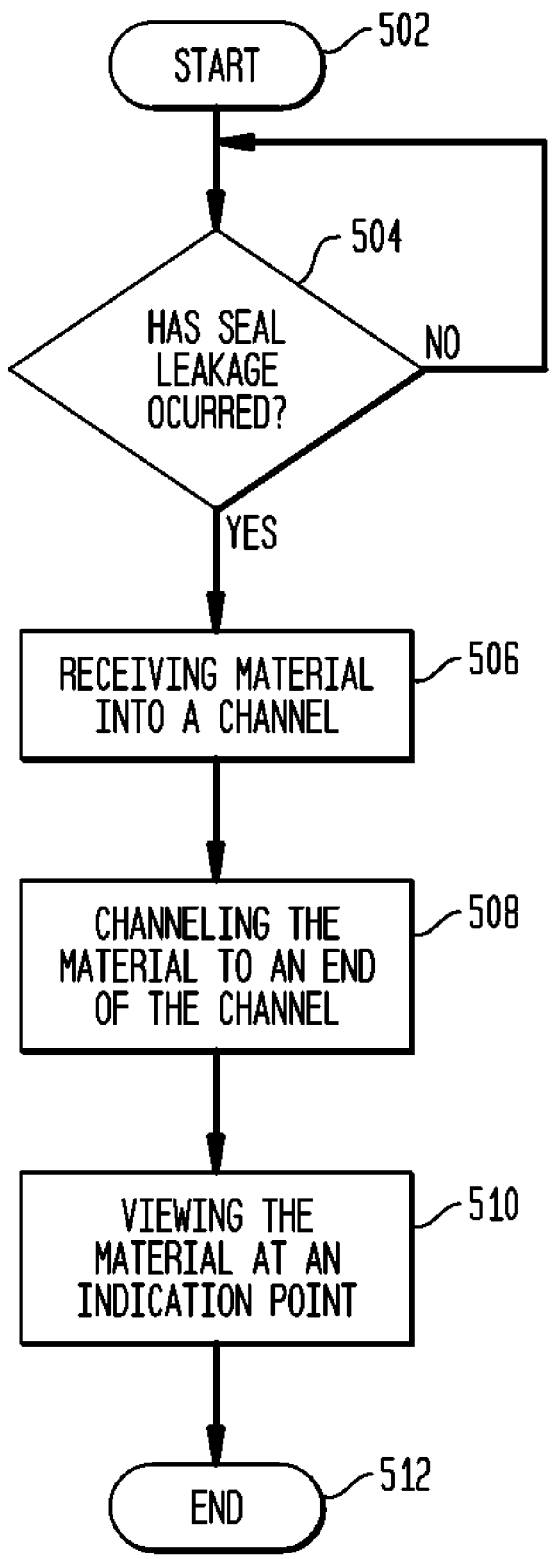
FIG. 5 is a flowchart depicting a method of indicating seal leakage in a nozzle repair shield in accordance with one embodiment of the present invention.

Referring lastly to FIG. 5, depicted is a flowchart of a method of indicating seal leakage in a nozzle repair shield in accordance with one embodiment of the present invention.

Method 500 begins at 502, at which a damaged nozzle has been identified and a nozzle repair shield has been installed thereupon as discussed in greater detail above with respect to FIG. 4B. Process 500 then proceeds to 504.

At 504, if leakage has not occurred between the nozzle repair shield and the repaired nozzle, process 500 remains at step 504 until seal leakage occurs. If no seal leakage occurs, no material is present at the end of the channel and no material is present to a viewer at the indication point. The absence of such material provides an indication to the viewer that the seal is intact and no leakage has occurred.

If seal leakage occurs, process 500 proceeds to 506. At 506, the material leaking through the seal continues to seep until it reaches a portion of the indicating channel (e.g., channel 310 as described above). Once it reaches the channel, the material is received into the channel and process 500 proceeds to 508.

At 508, the material present in the channel is channeled to the end of the channel. Such channeling may occur due to the conditions of the reaction vessel (i.e., the same conditions present on a first interior side of the leaking seal). Such conditions may include high temperature and high pressure conditions. Or, this channeling may occur due to the continued seepage of additional material into the channel, which causes the channel to fill, thereby pushing the material further through the channel until it eventually reaches the end of the channel. However, other methods of channeling this material may be substituted without departing from the scope of the present invention.

Process 500 then proceeds to 510 at which the material present at, or near, the end of the channel is viewable by a user via at least one indication point. For example, in the embodiment of the present invention depicted in FIGS. 1 through 4B, the end of channel 101 is reservoir 108 and the presence of material in reservoir 108 and/or upon external surface 128 indicates to the user/viewer that leakage of the seal has occurred. This allows the user to remedy the leak prior to the occurrence of damage, or additional damage, caused by the leaking seal. Process 500 then proceeds to 512, at which process 500 ends.

Although the leaking material has been described throughout as "seeping material", the leaking material may move in a manner other than seeping including, but not limited to, gushing, squirting, flooding, etc. without departing from the scope of the present invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An apparatus for repairing a nozzle having an integral seal leakage indication mechanism comprising:
   a main cylindrical section having a first end and a second end, said main cylindrical section having a first outwardly facing surface having a first section diameter;
   a sleeve, said sleeve having a first sleeve diameter of an inwardly facing sleeve surface having a magnitude greater than said first section diameter, said inwardly facing sleeve surface encircling said first outwardly facing surface;
   a flange disposed at said first end;
   a channel, said channel including a first end located in said first outwardly facing surface beneath said inwardly facing sleeve surface, said channel including a second end located in said flange, and said channel further comprising:
   a first annular channel section located in said outwardly facing surface;
   a second channel section located in said outwardly facing surface, said second channel section extending from said first annular channel section to said first end;
   a third annular channel section located in an inwardly facing surface of said flange;
   a fourth channel section located in said inwardly facing surface of said flange, said fourth channel section extending from said second channel section to said third annular channel section;
   a reservoir recessed in an external surface of said flange; and
   a fifth channel section located internal to said flange, said fifth channel section extending from said fourth channel section to said reservoir.

2. An apparatus according to claim 1, said channel further comprising:
   an extended second channel section located internal to said flange, said extended second channel section coupled to said second channel section; and
   a sixth channel section located internal to said flange, said sixth channel section extending from said reservoir to said extended second channel section.

3. An apparatus for repairing a nozzle having an integral seal leakage indication mechanism comprising:
   a main cylindrical section having a first end and a second end, said main cylindrical section having a first outwardly facing surface having a first section diameter;
   a sleeve, said sleeve having a first sleeve diameter of an inwardly facing sleeve surface having a magnitude greater than said first section diameter, said inwardly facing sleeve surface encircling said first outwardly facing surface;
   a flange disposed at said first end;
   a channel, said channel including a first end located in said first outwardly facing surface beneath said inwardly facing sleeve surface, said channel including a second end located in said flange, and said channel further comprising:
   a first annular channel section located in said outwardly facing surface;
   a second channel section located in said outwardly facing surface, said second channel section extending from said first annular channel section to said first end;
   a third annular channel section located in an inwardly facing surface of said flange;
   a reservoir recessed in an external surface of said flange;
   a fourth channel section located internal to said flange, said fourth channel section extending from said third annular channel section to said reservoir;
   an extended second channel section located internal to said flange, said extended second channel section coupled to said second channel section; and
   a fifth channel section located internal to said flange, said fifth channel section extending from said reservoir to said extended second channel section.

* * * * *